United States Patent
Sakabe

(10) Patent No.: US 6,723,764 B2
(45) Date of Patent: Apr. 20, 2004

(54) PREPARATION PROCESS OF ENLARGED LATEX

(75) Inventor: Hiroshi Sakabe, Ibaraki (JP)

(73) Assignee: Rohm and Haas Company, Philadelphia, PA (US)

(*) Notice: Subject to any disclaimer, the term of this patent is extended or adjusted under 35 U.S.C. 154(b) by 94 days.

(21) Appl. No.: 10/148,343
(22) PCT Filed: Dec. 14, 2000
(86) PCT No.: PCT/JP00/08843
§ 371 (c)(1), (2), (4) Date: May 30, 2002
(87) PCT Pub. No.: WO01/46267
PCT Pub. Date: Jun. 28, 2001

(65) Prior Publication Data
US 2003/0040555 A1 Feb. 27, 2003

(30) Foreign Application Priority Data
Dec. 20, 1999 (JP) ............................................. 11-360710

(51) Int. Cl.⁷ .............................. C08J 3/02; C08K 5/49; C08K 5/42; C08K 5/16
(52) U.S. Cl. .......................... 523/319; 523/335; 524/81; 524/115; 524/157; 524/200; 524/504; 524/571; 524/573; 524/706; 524/714; 524/742
(58) Field of Search ................................. 523/319, 335; 524/81, 115, 157, 200, 504, 571, 573, 706, 714, 742

(56) References Cited

U.S. PATENT DOCUMENTS

| 4,064,085 A | 12/1977 | Kosaka et al. |
| 4,194,999 A | 3/1980 | Hayashi et al. |

FOREIGN PATENT DOCUMENTS

| EP | 0271684 | 11/1987 |
| EP | 0624600 | 11/1994 |
| EP | 0779302 | 6/1997 |
| JP | 44-2229 | 1/1969 |
| JP | 59-073243 | 6/1978 |
| JP | 56-45921 | 10/1981 |
| JP | 09-071603 | 3/1997 |

Primary Examiner—Kriellion A. Sanders

(57) ABSTRACT

A process for preparing an enlarged latex, which comprises (1) causing (a) an anionic surfactant and (b) at least one surfactant selected from the group consisting of a cationic surfactant and an amphoteric surfactant to exist in a latex, (2) adding, as an aggregating and enlarging agent, at least one selected from the group consisting of (i) an inorganic acid, (ii) an organic acid, (iii) a substance which forms an acid in water, (iv) a combination of at least two substances which are reacted with each other to form an acid, and (v) a substance which forms an acid by exposure to active rays to the latex in the presence of these surfactants, and (3) causing the acid derived from the aggregating and enlarging agent to act on the latex, thereby enlarging the particle diameter of the latex, an enlarged latex obtained by the preparation process, a graft copolymer obtained by polymerizing a polymerizable monomer with the enlarged latex, and a resin composition comprising the graft copolymer and a thermoplastic resin.

27 Claims, No Drawings

PREPARATION PROCESS OF ENLARGED LATEX

TECHNICAL FIELD

The present invention relates to a process for preparing an enlarged latex having a larger particle diameter by enlarging a latex by aggregation, and more particularly to a process for preparing an enlarged latex, which is economical and high in productivity and permits enlarging a latex while retaining the stability of the latex. The present invention relates to a process for preparing a graft copolymer making use of such an enlarged latex, a resin composition containing the graft copolymer and a thermoplastic resin, etc.

BACKGROUND ART

A latex is an emulsion in which a polymer such as rubber or a plastic is dispersed in the form of colloid in water by an emulsifying agent. As synthetic latices, are prepared, for example, rubber latices such as styrene-butadiene rubber latices, acrylonitrile-butadiene rubber latices and polychloroprene rubber latices; and resin latices such as vinyl acetate (co)polymer latices, styrene (co)polymer latices and acrylic ester (co)polymer latices by emulsion polymerization. The latices are used in a wide variety of fields such as a field of synthetic resins, a field of paints, a field of treating agents of paper and fabrics and a field of civil engineering such as concrete and asphalt.

A latex is generally an emulsion in which a polymer having a fine particle diameter is dispersed. However, a latex having a larger particle diameter is required in many application fields as necessary for the end application intended. A graft copolymer obtained by polymerizing a vinyl monomer in the presence of a rubber latex is used as an impact modifier or the like for thermoplastic resins. In such graft copolymers, those having various particle diameters are chosen for use as necessary for the end application intended. In order to obtain a graft copolymer having a large particle diameter, a latex having a large particle diameter is preferably used.

A latex is generally prepared by an emulsion polymerization process. However, it takes a long polymerization time to obtain a latex having a large particle diameter by a seed polymerization process, so that productivity is lowered. In particular, when a diene monomer or a monomer mixture containing a diene monomer and a vinyl monomer will be polymerized by the seed polymerization process to obtain a latex having a large particle diameter, it takes a very long polymerization time. As a process for obtaining a latex having a large particle diameter in a short period of time, there has heretofore been proposed a process in which an inorganic acid, an organic acid, a salt, a polymeric flocculant and/or a latex for enlargement is added to a latex having a small particle diameter to enlarge the latex by aggregation.

For example, Japanese Patent Application Laid-Open No. 71603/1997 has proposed a process in which so mild shear as to produce no rubber lump is applied to a diene polymer rubber latex obtained by emulsion polymerization to enlarge the latex by aggregation mainly by virtue of Brownian aggregation while facilitating mixing of a flocculant. The Brownian aggregation means that latex particles undergo Brownian movement, thereby colliding with one another to aggregate. More specifically, the process comprises lowering the number of revolutions upon stirring in enlargement of the latex by aggregation making use of the flocculent to conduct aggregation mainly by virtue of Brownian movement, thereby inhibiting the formation of aggregated lumps to enlarge the latex by aggregation. This process uses shear aggregation by a stirring blade and Brownian aggregation in combination. According to this process, particles of the latex can be enlarged to a certain extent. However, the particles cannot be enlarged to a sufficient extent judging from Examples thereof. In addition, in this process, an acid is used as a flocculant, and the flocculant is added so as to keep the pH of the system at 5 or lower. When it is intended to raise the pH of the system by adding a basic substance to the enlarged latex obtained by this process so as to stabilize the latex, however, the stability of the latex becomes insufficient due to a high salt concentration in the system. Therefore, when graft polymerization of a vinyl monomer has been attempted in the presence of said latex, a problem that deposit is easy to be formed has arisen.

Japanese Patent Publication No. 2229/1969 has proposed a process in which a formaldehydesulfoxylate and a peroxide are added to an aqueous dispersion containing fine particles of a butadiene polymer to enlarge the particles while causing graft polymerization to progress by adding a monomer to the dispersion. According to this process, however, it is difficult to enlarge the particles to a sufficient extent.

Japanese Patent Application Laid-Open No. 45921/1981 has proposed a process in which an acrylic ester-unsaturated acid copolymer latex obtained by polymerization in the presence of an anionic surfactant and having a pH of 4 or higher is added to a synthetic rubber latex the pH of which has been adjusted to 7 or higher, thereby enlarging the particle diameter of the synthetic rubber latex. According to this process, however, it is necessary to separately prepare the latex for enlargement. Therefore, this process is complicated in operation and not preferable from the economical point of view. In addition, when graft polymerization of a vinyl monomer has been attempted in the presence of the synthetic rubber latex enlarged by adding such an acrylic ester-unsaturated acid copolymer latex, a problem that the stability of the latex is impaired to form aggregated lumps has arisen.

DISCLOSURE OF THE INVENTION

It is an object of the present invention to provide a process for preparing an enlarged latex, which is economical and high in productivity and permits enlarging a latex while retaining the stability of the latex.

Another object of the present invention is to provide a process for preparing an enlarged latex the stability of which is not impaired even when a polymerizable monomer is graft polymerized in the presence of the enlarged latex.

A further object of the present invention is to provide an enlarged latex having such excellent various properties, a process for preparing a graft copolymer by polymerizing a polymerizable monomer in the presence of such an enlarged latex, a resin composition containing the graft copolymer and a thermoplastic resin, and a graft copolymer (latex, slurry or particles) having an even particle diameter distribution.

The present inventors have carried out an extensive investigation with a view toward achieving the above objects. As a result, it has been conceived to cause an anionic surfactant and a cationic surfactant and/or an amphoteric surfactant to exist in a latex and add an acid or a substance capable of forming an acid as an aggregating and enlarging agent thereto to cause the acid to act, thereby enlarging the particle diameter of the latex.

When the pH of a latex stabilized by an anionic surfactant is lowered by an acid, the primary particles of the latex are aggregated and enlarged. However, the stabilizing effect by the anionic surfactant becomes weak as the pH is lowered, so that the stability of the latex tends to be impaired. On the other hand, when an anionic surfactant and a cationic surfactant and/or an amphoteric surfactant are caused to exist in a latex, (1) the system is stable by virtue of the stabilizing effect by the anionic surfactant when the pH is high, (2) the stabilizing effect by the anionic surfactant is weakened when the pH is lowered by an acid, so that aggregation and enlargement of latex particles occur, and (3) the system is stabilized again by virtue of the stabilizing effect by the cationic surfactant and/or the amphoteric surfactant when the pH is more lowered. As a result, a stabilized enlarged latex can be obtained. Even when the stabilized enlarged latex is used in a graft polymerization reaction, the stability of the system is not impaired.

When the lowering of the pH in this process is conducted by using a combination of at least two substances which are reacted with each other to form an acid, such as a combination of hydrogen peroxide with a formaldehydesulfoxylate, and enlargement by aggregation is conducted by Brownian aggregation without conducting stirring during the enlargement by aggregation, an enlarged latex having a narrow particle diameter distribution and a large particle diameter can be stably formed.

A graft copolymer obtained by graft polymerizing a polymerizable monomer on the enlarged latex obtained by the process according to the present invention can be used in various application fields by itself and also exhibits excellent properties as an impact modifier for thermoplastic resins. The present invention has been led to completion on the basis of these findings.

According to the present invention, there is thus provided a process for preparing an enlarged latex by enlarging a latex by aggregation, which comprises
(1) causing
  (a) an anionic surfactant and
  (b) at least one surfactant selected from the group consisting of a cationic surfactant and an amphoteric surfactant
to exist in the latex,
(2) adding, as an aggregating and enlarging agent, at least one selected from the group consisting of:
  (i) an inorganic acid,
  (ii) an organic acid,
  (iii) a substance which forms an acid in water,
  (iv) a combination of at least two substances which are reacted with each other to form an acid, and
  (v) a substance which forms an acid by exposure to active rays
to the latex in the presence of these surfactants, and
(3) causing the acid derived from the aggregating and enlarging agent to act on the latex, thereby enlarging the particle diameter of the latex.

According to the present invention, there is also provided an enlarged latex obtained by the preparation process described above. According to the present invention, there are further provided a process for preparing a graft copolymer, which comprises polymerizing a polymerizable monomer in the presence of the enlarged latex described above, and a resin composition comprising the graft copolymer obtained by this preparation process and a thermoplastic resin.

According to the present invention, there is still further provided a graft copolymer containing an anionic surfactant and at least one surfactant selected from the group consisting of a cationic surfactant and an amphoteric surfactant and having a ratio (Dv/Dn) of the volume average particle diameter (Dv) to the number average particle diameter (Dn) of 1.2 to 1.8.

BEST MODE FOR CARRYING OUT THE INVENTION

1. Latex:

A latex used in the present invention may be that prepared by any process. However, a latex synthesized by emulsion polymerization is generally used. No particular limitation is imposed on components forming the latex. As examples thereof, however, may be mentioned (co)polymers of diene monomers such as butadiene, isoprene and chloroprene; (co)polymers of vinyl monomers such as styrene, acrylonitrile, acrylic esters, methacrylic esters, ethylene, vinyl chloride, vinylidene chloride, vinyl acetate and vinyl fluoride; copolymers of a diene monomer with a vinyl monomer; silicone resins such as polyorganosiloxanes; and polyester, epoxy resins, melamine resins, polyamide and polyurethane. These polymers may be used either singly or in any combination thereof. The latex may have a structure such as a core/shell structure and be an organic.inorganic composite latex.

In order to regulate a surface charge of the latex to control the enlargement by aggregation, a latex obtained by copolymerizing such a diene monomer and/or vinyl monomer as described above with a monomer having an anionic and/or cationic functional group may also be used. Examples of the monomer having the functional group include acrylic acid, methacrylic acid, itaconic acid, fumaric acid, acrylamide, methacrylamide, hydroxyethyl methacrylate, hydroxyethyl acrylate and glycidyl methacrylate. Further, a crosslinkable monomer such as divinylbenzene, ethylene glycol dimethacrylate, trimethylolpropane trimethacrylate or 1,3-butanediol diacrylate may be used in combination.

Upon polymerization of the latex, a radical polymerization initiator, heat decomposable polymerization initiator, redox initiator or the like may be used. Besides, light, X-rays or the like may also be used. A chain transfer agent such as t-dodecylmercaptan, n-octylmercaptan or α-methylstyrene dimer may be used upon the polymerization as needed. Surfactants are used upon the polymerization. Regarding this, however, description will be given subsequently.

These latices may be used either singly or in any combination thereof. Of these, the (co)polymer latices of diene monomers, (co)polymer latices of vinyl monomers, and copolymer latices of a diene monomer with a vinyl monomer are preferred. When the process according to the present invention is applied to a diene (co)polymer latex containing a diene monomer such as butadiene, a great effect is achieved, and particularly preferable results are yields from the viewpoint of shortening of polymerization time.

Examples of the diene (co)polymer latex include (co)polymer latices of diene monomers such as butadiene, isoprene and chloroprene; and copolymer latices of a diene monomer with a vinyl monomer. Examples of the vinyl monomer copolymerized with the diene monomer include aromatic vinyl monomers such as styrene and α-methylstyrene; alkyl (meth)acrylate monomers such as methyl methacrylate and n-butyl acrylate; and unsaturated nitrile monomers such as acrylonitrile. Example of the (co)polymer latices of the diene monomers include polybutadiene latices. Examples of the diene copolymer include copolymer rubbers of a diene monomer such as butadiene with a vinyl monomer such as styrene. No particular limitation is imposed on the copolymerization ratio of the diene monomer to the vinyl monomer. However, for example, copolymers of 50 to 99 wt. % of a diene monomer with 1 to 50 wt. % of a vinyl monomer may be mentioned.

No particular limitation is imposed on the particle diameter (volume average particle diameter) of the latex. However, it is preferably 200 nm or smaller, more preferably 150 nm or smaller because even a latex having a fine particle diameter of 150 nm or smaller, furthermore 100 nm or smaller can be effectively enlarged by the process according to the present invention.

2. Surfactant:

In the present invention, (a) an anionic surfactant and (b) at least one surfactant selected from the group consisting of a cationic surfactant and an amphoteric surfactant are caused to exist in the latex. As an example of a process for causing these surfactants to exist in the latex, is mentioned a process in which emulsion polymerization is conducted with the anionic surfactant upon preparation of the latex, and the cationic surfactant and/or the amphoteric surfactant is then added to the resultant latex. When the cationic surfactant and/or the amphoteric surfactant is added to the latex containing the anionic surfactant, however, deposit may be formed in some cases. In such a case, is preferred a process in which the cationic surfactant and/or the amphoteric surfactant has been added in advance together with the anionic surfactant upon the preparation of the latex. In order to prevent the formation of the deposit, a process in which polymerization is conducted with the anionic surfactant, and the cationic surfactant and/or the amphoteric surfactant is added during or after the polymerization in a state that the cationic surfactant and/or the amphoteric surfactant has been mixed with an excess amount of the anionic surfactant may also be adopted.

As examples of the anionic surfactant, may be mentioned those commonly used in emulsion polymerization, such as carboxylic acid salts, sulfonic acid salts, sulfuric ester salts and phosphoric ester salts. Of these, are preferred the carboxylate type surfactants, for example, alkali metal salts of higher fatty acids, such as sodium oleate, potassium oleate, sodium stearate, potassium stearate, sodium myristate, potassium myristate, sodium palmitate, potassium palmitate, potassium laurate, potassium undecanate, sodium linolate, potassium linolate, potassium caprylate, potassium nonanate and potassium caprinate; alkali metal salts of rosinic acid, such as disproportionating potassium rosinate; alkali metal salts of alkylsarcosinic acids; and alkali metal salts of alkenylsuccinic acids. These anionic surfactants may be used either singly or in any combination. When a carboxylate type anionic surfactant is used, a sulfonate type anionic surfactant and a nonionic surfactant may be used as assistant in combination.

Examples of the cationic surfactant include quaternary ammonium salts having at least one alkyl group, primary to tertiary amine salts having at least one alkyl group, alkylphosphonium salts and alkylsulfonium salts. More specifically, as examples thereof, may be mentioned benzalkonium chloride, alkyltrimethylammonium chlorides, alkylamine acetates, alkylamine hydrochlorides, dialkyldimethylammonium chloride, alkylisoquinolinium chlorides and alkylisoquinolinium bromides.

As examples of the amphoteric surfactant, may be mentioned betaines such as N-octylbetaine, N-decylbetaine, N-undecylbetaine, N-dodecylbetaine, N-tetradecylbetaine, N-hexadecylbetaine, octylbetaine, decylbetaine and dodecylbetaine; carboxylic acid type amphoteric surfactants containing a betaine such as sulfobetaine or sulfatebetaine; sulfate type amphoteric surfactants, such as hydroxyethylimidazoline sulfate; and sulfonic acid type amphoteric surfactants such as imidazolinesulfonic acid.

The surfactants selected from the group consisting of the cationic surfactants and amphoteric surfactants may be used either singly or in any combination thereof. No particular limitation is imposed on the using ratio of (a) the anionic surfactant to (b) the cationic surfactant and/or the amphoteric surfactant. It is however desirable that (b) the cationic surfactant and/or the amphoteric surfactant be caused to exist in a proportion of preferably 0.01 to 100 mol, more preferably 0.1 to 80 mol, still more preferably 1 to 50 mol per 100 mol of (a) the anionic surfactant from the viewpoints of stability of the latex, control of enlargement by aggregation and stability of the enlarged latex. The surfactants are generally used in a proportion of 0.1 to 5 parts by weight in total per 100 parts by weight of the (co)polymer component in the latex or the monomer(s) forming the (co)polymer component.

3. Aggregating and Enlarging Agent:

In the present invention, at least one selected from the group consisting of (i) an inorganic acid, (ii) an organic acid, (iii) a substance which forms an acid in water, (iv) a combination of at least two substances which are reacted with each other to form an acid, and (v) a substance which forms an acid by exposure to active rays is used as an aggregating and enlarging agent.

As examples of the inorganic acid, may be mentioned hydrochloric acid, sulfuric acid, nitric acid and phosphoric acid. As examples of the organic acid, may be mentioned acetic acid, formic acid, tartaric acid, malic acid and butyric acid. As examples of the substance which forms an acid in water, may be mentioned acid anhydrides such as acetic anhydride and maleic anhydride; and esters such as sulfuric esters and phosphoric esters.

As the combination of at least two substances which are reacted with each other to form an acid, is preferred a combination of substances which form an acid by a redox reaction, and specific examples thereof may include combinations of peroxide/formaldehyde, peroxide/sulfoxylic acid salt and peroxide/formaldehydesulfoxylate. Of these, the combination of peroxide/formaldehydesulfoxylate (for example, sodium formaldehydesulfoxylate) is preferred.

No particular limitation is imposed on the substance which forms an acid by exposure to active rays so far as it is a substance which forms a Brønsted acid or Lewis acid by exposure to active rays. Specific examples thereof include onium salts, halogenated organic compounds, quinonediazide compounds, α,α-bis(sulfonyl)diazomethane compounds, α-carbonyl-α-sulfonyl-diazomethane compounds, sulfonic compounds, organic ester compounds, organic acid amide compounds and organic acid imide compounds. Examples of the active rays include ultraviolet rays, far ultraviolet rays, electron rays and laser beams.

These acids and acid-forming substances are generally added in the form of an aqueous solution to the latex. With respect to the amount added, it is desired that an amount in which the enlargement of the latex is easy to be achieved within limits not forming any aggregated lump of the latex be confirmed by experiments, since the acidity varies according to the kind of the acid or acid-forming substance. Preferable experimental examples in this respect are specifically shown in respective Examples.

In order to adjust the particle diameter of the enlarged latex, the aggregating and enlarging agent and a salt may be used in combination. The salt may be contained in the latex in advance or added prior to an enlarging treatment by aggregation. Examples of salts having no pH-buffering effect include sodium chloride, potassium chloride and calcium chloride. Examples of salts having a pH-buffering effect include sodium pyrophosphate, sodium carbonate and ammonium sulfate.

4. Enlarging Treatment:

In the present invention, the acid derived from the aggregating and enlarging agent is caused to act on a latex, thereby enlarging the particle diameter of the latex. More specifically, an anionic surfactant and a cationic surfactant and/or an amphoteric surfactant are caused to exist in the latex, and an acid or acid-forming substance is added as the aggregating and enlarging agent to the latex, thereby causing the acid derived from the aggregating and enlarging agent to act on the latex. When the aggregating and enlarging agent is an inorganic acid, an organic acid or a substance which forms an acid in water, the acid immediately performs an aggregating and enlarging action in the latex.

When the aggregating and enlarging agent is a combination of at least two substances which are reacted with each other to form an acid, a chemical reaction between these substance takes place in the latex to form an acid, and said acid performs an aggregating and enlarging action. When the aggregating and enlarging agent is a substance which forms an acid by exposure to active rays, the latex is exposed to the active rays to form an acid, and the acid thus formed performs an aggregating and enlarging action.

In order to enhance the enlarging effect upon the enlarging treatment by aggregation, ultrasonic vibration may be applied. No particular limitation is imposed on the treating temperature upon the enlargement by aggregation. However, it is preferably 20 to 90° C. that is a temperature generally easy to control, more preferably a temperature not lower than the glass transition temperature of the polymer component forming the latex.

The enlarging treatment by aggregation may be conducted while stirring the latex. However, the stirring may be stopped after the aggregating and enlarging agent is added, and stirring and mixing are lightly conducted so as to uniformly disperse. When no stirring of the latex is conducted, the enlargement of the latex takes place by Brownian aggregation of latex particles. When the aggregating and enlarging agent is the combination of at least two substances which are reacted with each other to form an acid, or the substance which forms an acid by exposure to active rays in particular, a method in which the latex is enlarged by Brownian aggregation without conducting stirring of the latex in the step of causing the acid to act on the latex is preferred from the viewpoint of providing an enlarged latex narrow in particle diameter distribution represented by a ratio (Dv/Dn) of the volume average particle diameter (Dv) to the number average particle diameter (Dn). In this case, it is considered that the formation of the acid in the system and Brownian aggregation by the action of the acid are caused to progress in well balanced relation, and consequently a latex having a narrow particle diameter distribution and uniformly enlarged is formed. The latex having a narrow particle diameter distribution and uniformly enlarged can exhibit high quality and high performance when it is used in various fields.

After the enlarging treatment of the latex, a basic substance such as sodium hydroxide, potassium hydroxide, sodium carbonate or potassium carbonate is generally added to the latex to neutralize the acid. These basis substances are generally added in the form of an aqueous solution to the latex.

No particular limitation is imposed on the particle diameter of the enlarged latex. However, it is generally 150 nm or greater, preferably about 200 to 1,000 nm in terms of the volume average particle diameter (Dv) thereof. Even when the process according to the present invention is applied to a latex having a fine particle diameter, the latex can be enlarged to a volume average particle diameter of preferably 200 nm or greater, more preferably 250 nm or greater. The latex may be enlarged to 300 nm or greater, furthermore 350 nm or greater as needed. When the volume average particle diameter is enlarged to 300 nm or greater in particular, the effect of the present invention is markedly exhibited. No particular limitation is imposed on the particle diameter distribution (Dv/Dn) of the enlarged latex. According to the process of the present invention, however, an enlarged latex having an even particle diameter of preferably 1.2 to 1.8, more preferably 1.2 to 1.6, still more preferably 1.2 to 1.5 in terms of Dv/Dn can be provided.

5. Graft Polymerization and Graft Copolymer:

The enlarged latex obtained by the process described above is subjected to graft polymerization, whereby a graft copolymer can be obtained. The graft polymerization can be conducted by polymerizing a polymerizable monomer in the presence of the enlarged latex. No particular limitation is imposed to a graft polymerization process. However, an emulsion polymerization process and a suspension polymerization process are preferred. Upon the graft polymerization, a surfactant such as an anionic surfactant, cationic surfactant, amphoteric surfactant or nonionic surfactant; a suspending agent such as an organic suspending agent or inorganic suspending agent; etc. may be suitably added to more stabilize the system. No particular limitation is imposed on the polymerizable monomer used in the graft polymerization. However, it is preferably a vinyl monomer. No particular limitation is also imposed on the weight ratio of the enlarged latex to the polymerizable monomer. However, they are preferably graft polymerized in such proportions that the solid content of the enlarged latex is 5 to 95 wt. %, and the content of the vinyl monomer is 95 to 5 wt. %.

As examples of the vinyl monomer, may be mentioned aromatic vinyl monomers such as styrene and α-methylstyrene; aromatic polycyclic vinyl monomers such as 4-vinylbiphenyl and 2-vinylnaphthalene; unsaturated nitriles such as acrylonitrile and methacrylonitrile; alkyl (meth)acrylate monomers such as methyl methacrylate, and butyl acrylate; unsaturated carboxylic acids such as acrylic acid, methacrylic acid, maleic acid and maleic anhydride; and maleimide monomers such as maleimide and N-phenylmaleimide. These vinyl monomers may be used either singly or in any combination thereof.

A polyfunctional vinyl monomer such as divinylbenzene, allyl methacrylate, ethylene glycol dimethacrylate or 1,3-butylene dimethacrylate may be suitable used in combination upon the polymerization of the vinyl monomer. A chain transfer agent such as t-dodecylmercaptan or n-octylmercaptan may also be used.

The vinyl monomer graft polymerized on the enlarged latex may be added into the reaction system at once, in several portions, continuously or in any combination thereof. When the graft polymerization is conducted in two or more stages, the monomer compositions in respective stages may be the same or different from each other.

When the graft polymerization is conducted with the enlarged latex by emulsion polymerization or suspension polymerization, a graft copolymer latex or slurry containing the anionic surfactant and the cationic surfactant and/or the amphoteric surfactant is provided. The ratio (Dv/Dn) of the volume average particle diameter (Dv) to the number average particle diameter (Dn) in the graft copolymer according to the present invention is preferably 1.2 to 1.8, more preferably 1.2 to 1.6, still more preferably 1.2 to 1.5, and so the particle diameter thereof is even. In a graft copolymer obtained by conducting the graft polymerization by suspension polymerization, however, the particle diameter distribution of a portion to be grafted does often not correspond to the particle diameter distribution of the graft copolymer. Therefore, the particle diameter distribution (Dv/Dn) of such a graft copolymer is determined to mean the ratio of the volume average particle diameter to the number average particle diameter (Dn) in the portion to be grafted.

Since the number of coarse particles becomes decreased by the narrow particle diameter distribution of the graft copolymer and deterioration of transparency caused by scattering of light due to the coarse particle can be prevented, the transparency thereof can be enhanced. In addition, since particles having a particle diameter effective for enhancement of strength become increased by the narrow particle diameter distribution of the graft copolymer, the strength thereof is also enhanced. It is preferred from the viewpoint of transparency in particular that the kinds and combination of the vinyl monomers subjected to graft polymerization be selected in such a manner that the refractive indices of the polymer (enlarged latex particles) to be grafted and the resulting graft copolymer consist with each other. For example, when the enlarged latex is a butadiene rubber latex or styrene-butadiene rubber latex, styrene, methacrylic acid, butyl acrylate, etc. are suitably combined as vinyl monomers subjected to the graft polymerization, whereby the refractive indices of the polymer to be grafted and the resulting graft copolymer can be caused to consist with each other. It is preferred that a difference in refractive index between the polymer to be grafted and the graft copolymer be 0.02 or smaller.

The volume average particle diameter of the graft copolymer is generally 150 nm or greater, preferably about 200 to 1,000 nm. When the volume average particle diameter is 300 nm or greater in particular, the effect by the application of the present invention is marked. As described above, however, the volume average particle diameter of a graft copolymer obtained by conducting the graft polymerization by the suspension polymerization is determined to mean the volume average particle diameter of the portion to be grafted.

After the graft polymerization, the graft copolymer is provided as a latex, slurry or particles separated and collected therefrom. No particular limitation is imposed on a method for separating and collecting the graft copolymer as particles from the latex or slurry. However, as examples thereof, may be mentioned a method in which a coagulant such as hydrochloric acid or calcium chloride is added to the latex to coagulate particles, and the resultant slurry is dehydrated and dried, and a method in which the latex is sprayed in heated air to dry it. In any method, additives such as antioxidants, ultraviolet absorbents, anti-blocking agents, pigments, fillers, lubricants, antistatic agents and antibacterial agents may be suitably added before or after the coagulation and drying. The graft copolymer may be used as a thermoplastic resin by itself. In such a case, dry particles may be subjected to molding or forming and processing as they are or after pelletizing them. No particular limitation is imposed on a forming or molding method. For example, processing methods used for ordinary thermoplastic resins, such as calendering, extrusion, blow molding and injection molding, may be adopted.

6. Resin Composition:

The graft copolymer according to the present invention can be blended with a thermoplastic resin to prepare a resin composition. A blending ratio (based on solids content) between both may be suitably determined according to the purpose of use and desired properties. In general, they may be suitably selected within ranges of 0.1 to 99.9 wt. % for the graft copolymer and 99.9 to 0.1 wt. % for the thermoplastic resin. In many cases, good results can be yielded in proportions of 1 to 99 wt. % for the graft copolymer and 99 to 1 wt. % for the thermoplastic resin. When the graft copolymer is blended as an impact modifier with a thermoplastic resin such as a vinyl chloride resin, they may be often blended with each other in proportions of 1 to 50 wt. % for the graft copolymer and 99 to 50 wt. % for the thermoplastic resin.

No particular limitation is imposed on the thermoplastic resin. As examples thereof, however, may be mentioned polystyrene, high impact polystyrene (HI polystyrene resins), acrylic resins, methyl methacrylate-styrene resins (MS resins), vinyl chloride resins, chlorinated vinyl chloride resins, acrylonitrile-styrene resins (AS resins), acrylonitrile-butadiene-styrene resins (ABS resins), thermoplastic polyester resins and polycarbonate resins. These thermoplastic resins may be used either singly or in any combination thereof.

Additives, for example, antioxidants, ultraviolet absorbents, anti-blocking agents, pigments, fillers, lubricants, antistatic agents, antibacterial agents, etc. may be suitably added upon the preparation of the resin composition. No particular limitation is imposed on a blending method. Therefore, they may also be mixed with each other by means of a ribbon blender, Henschel mixer or the like. This resin composition may be subjected to molding or forming and processing as it is or after pelletizing it. No particular limitation is imposed on a forming or molding method. For example, processing methods used for ordinary thermoplastic resins, such as calendering, extrusion, blow molding and injection molding, may be adopted.

When the resin composition comprising the graft copolymer and the thermoplastic resin is used as a transparent molded or formed product, it is desirable that the respective compositions be adjusted so as to lessen a difference in refractive index between the graft copolymer and the thermoplastic resin in addition to the lessened difference in refractive index between the polymer to be grafted and the graft copolymer. When transparency is regarded as important, it is preferable that the difference in refractive index between them be controlled to 0.02 or smaller.

EXAMPLES

The present invention will hereinafter be described more specifically by the following Examples and Comparative Examples. However, the present invention is not limited at all by these examples. Incidentally, all designations of "part" or "parts" and "%" as will be used in the following examples mean part or parts by weight and wt. % unless expressly noted. Physical properties in the examples were determined in accordance with the following respective methods.

(1) Volume Average Particle Diameter and Particle Diameter Distribution:

The volume average particle diameter (Dv; also referred to as "average particle diameter" merely) of each sample was determined by subjecting an electron microscope photograph obtained by using a transmission type electron microscope to image analysis by an image analyzer (manufactured by Asahi Chemical Industry Co., Ltd.;

IP-500PC). The particle diameter distribution (Dv/Dn) thereof was determined by calculating out a ratio of the volume average particle diameter (Dv) to a number average particle diameter (Dn) obtained by subjecting the sample to image analysis in the same manner as described above.

(2) Refractive Index of Enlarged Latex-Forming Component:

A cast film was formed with each enlarged latex sample, and the resultant cast film was immersed in methyl alcohol and then vacuum dried at room temperature for 24 hours, thereby preparing a sample film. With respect to the sample film, the refractive index was measured at 23° C. by means of an Abbe's refractometer.

(3) Refractive Indices of Graft Copolymer and Thermoplastic Resin:

Each graft copolymer or thermoplastic resin sample was hot pressed at 200° C. to prepare a sample film. With respect to the sample film, the refractive index was measured at 23° C. by means of an Abbe's refractometer.

(4) Impact Strength of Molded Product:

Specimen having a thickness of 3 mm or 6 mm were prepared by means of an injection molding machine IS-80 manufacture by Toshiba Machine Co., Ltd. With respect to these specimens, the impact strength was determined at 23° C. or −10° C. in accordance with JIS K 7110.

(5) Transparency of Molded Product:

Each graft copolymer or thermoplastic resin composition sample was pelletized by means of an extruder and a pelletizer. The resultant pellet sample was hot pressed at 200° C. to prepare a sample plate having a thickness of 3 mm. With respect to this sample plate, the transmittance for parallel rays and haze were measured at 23° C. by means of a haze meter.

Example 1

1. Preparation of Latex:

After a pressure container equipped with a stirrer was charged with

| | |
|---|---|
| sodium chloride | 0.075 parts |
| ferrous sulfate | 0.005 parts |
| disodium ethylenediaminetetraacetate | 0.008 parts |
| sodium formaldehydesulfoxylate | 0.05 parts |
| benzalkonium chloride (cationic surfactant) | 0.02 parts |
| potassium oleate (anionic surfactant) | 0.37 parts |
| distilled water | 200 parts |
| and purged with nitrogen, | |
| diisopropylbenzene hydroperoxide | 0.1 parts |
| butadiene | 75 parts |
| styrene | 25 parts | were added. The contents were then held at 60° C. for 15 hours to conduct polymerization, thereby obtaining Latex (A-1) having a conversion of 98% and a volume average particle diameter of 98 nm.

2. Enlargement by Aggregation:

While holding the Latex (A-1) obtained above at 70° C.,

| | |
|---|---|
| sodium formaldehydesulfoxylate (5% aqueous solution) | 3.8 parts |
| hydrogen peroxide (5% aqueous solution) | 2.08 parts | were added, and the contents were stirred and mixed. The stirring was then stopped to hold the mixture for 1 hour. Five parts of sodium hydroxide (1% aqueous solution) were then added, and the contents were stirred and mixed to obtain Enlarged Latex (B-1). Enlarged Latex (B-1) had a volume average particle diameter of 460 nm and a Dv/Dn of 1.38 and was mechanically stable. Incidentally, the sum total of deposits and attachments to the polymerizer was 0.05% based on the charged monomers.

Example 2

1. Preparation of Latex:

Latex (A-2) having a conversion of 98% and a volume average particle diameter of 92 nm was obtained by conducting polymerization in the same manner as in Example 1 except that 100 parts of butadiene were used in place of 75 parts of butadiene and 25 parts of styrene in the preparation of the latex in Example 1.

2. Enlargement by Aggregation:

Latex (A-2) obtained above was enlarged by aggregation in the same manner as in Example 1 except that

| | |
|---|---|
| sodium formaldehydesulfoxylate (5% aqueous solution) | 4.2 parts |
| hydrogen peroxide (5% aqueous solution) | 2.32 parts | were added to Latex (A-2), thereby obtaining Enlarged Latex (B-2). Enlarged Latex (B-2) had a volume average particle diameter of 500 nm and a Dv/Dn of 1.35 and was mechanically stable. Incidentally, the sum total of deposits and attachments to the polymerizer was 0.07% based on the charged monomers.

Example 3

1. Preparation of Latex:

Latex (A-3) having a conversion of 98% and a volume average particle diameter of 98 nm was obtained by conducting polymerization in the same manner as in Example 1 except that the amount of benzalkonium chloride (cationic surfactant) was increased from 0.02 parts to 0.05 parts in the preparation of the latex in Example 1, and 100 parts of butadiene were used in place of 75 parts of butadiene and 25% of styrene.

2. Enlargement by Aggregation:

Latex (A-3) obtained above was enlarged by aggregation in the same manner as in Example 1 except that

| | |
|---|---|
| sodium formaldehydesulfoxylate (5% aqueous solution) | 3.5 parts |
| hydrogen peroxide (5% aqueous solution) | 3.5 parts | were added to Latex (A-3), thereby obtaining Enlarged Latex (B-3). Enlarged Latex (B-3) had a volume average particle diameter of 250 nm and a Dv/Dn of 1.40 and was mechanically stable. Incidentally, the sum total of deposits and attachments to the polymerizer was 0.04% based on the charged monomers.

Comparative Example 1

It was intended to obtain an enlarged latex in the same manner as in Example 1 except that no benzalkonium chloride (cationic surfactant) was added in the preparation of the latex in Example 1. Although an enlarged latex having an average particle diameter of 500 nm was formed after holding the contents for 1 hour after the stirring was stopped in the step of enlarging by aggregation, solids were deposited as lumps as soon as stirring was started after sodium hydroxide for neutralization was added, so that no stable enlarged latex was able to be obtained.

Comparative Example 2

Latex (A-1) having a volume average particle diameter of 98 nm obtained in Example 1 was used as seed particles to attempt the preparation of a latex having a great particle diameter by a seed polymerization process in place of the enlargement by aggregation.

After a polymerizer was charged with

| | |
|---|---|
| sodium chloride | 0.075 parts |
| ferrous sulfate | 0.005 parts |
| disodium ethylenediaminetetraacetate | 0.008 parts |
| sodium formaldehydesulfoxylate | 0.05 parts |
| potassium oleate | 0.37 parts |
| Latex (A-1) (in terms of solids) | 1 parts |
| distilled water | 200 parts |
| and purged with nitrogen, the contents were held at 60° C., and | |
| butadiene | 74.25 parts |
| styrene | 24.75 parts |
| diisopropylbenzene hydroperoxide | 1 part |
| sodium formaldehydesulfoxylate | 0.5 parts | were then added over 60 hours. The contents were then held at 60° C. for 30 hours. As a result, the volume average particle diameter was enlarged to 430 nm, but the conversion did not reach 95%.

Comparative Example 3

1. Preparation of Latex:

After a pressure container equipped with a stirrer was charged with

| | |
|---|---|
| tetrasodium pyrophosphate | 0.1 parts |
| ferrous sulfate | 0.005 parts |
| disodium ethylenediaminetetraacetate | 0.008 parts |
| sodium formaldehydesulfoxylate | 0.05 parts |
| potassium oleate | 0.37 parts |
| distilled water | 200 parts |
| and purged with nitrogen, | |
| diisopropylbenzene hydroperoxide | 0.1 parts |
| butadiene | 75 parts |
| styrene | 25 parts | were added. The contents were then held at 60° C. for 15 hours to obtain Latex (a-3) having a conversion of 98% and a volume average particle diameter of 97 nm.

2. Enlargement by Aggregation:

While holding the Latex (a-3) obtained above at 60° C., 0.2 parts of disodium dodecyl phenyl ether disulfonate were added, and the number of revolutions upon stirring was then decreased. Although 1.2 parts of phosphoric acid (5% aqueous solution) were added to conduct enlargement by aggregation, the latex was solidified.

<Consideration>

Example 1 shows an example where the present invention was applied to the butadiene-styrene copolymer latex, and Examples 2 and 3 show examples where the present invention was applied to the butadiene polymer latices. In any case, a stable enlarged latex was obtained in a short period of time.

On the other hand, Comparative Example 1 shows an example where no cationic surfactant was used upon the preparation of the butadiene-styrene copolymer latex. Even in the case of Comparative Example 1, enlargement by aggregation is caused to progress. However, the restabilizing effect by the cationic surfactant upon lowering the pH of the system is not developed. Therefore, when sodium hydroxide was added to enhance the pH of the system, thereby attempting to stabilize the system, solids are deposited due to shearing force by the stirring, resulting in a failure to obtain a stable enlarged latex.

Comparative Example 2 shows an example where it was intended to obtain a latex having the same particle diameter as in Example 1. It takes a very long time to conduct the polymerization. Therefore, the example is poor in productivity and not an economical process. Comparative Example 3 shows an example where Example (A-2) described in Japanese Patent Application Laid-Open No. 71603/1998, in which enlargement of particle diameter to 260 nm was achieved, was simulated with no cationic surfactant used, and the part of phosphoric acid added was increased so as to achieve a greater particle diameter. However, the latex was solidified as a whole, resulting in a failure to obtain an enlarged latex.

Example 4

1. Graft Polymerization:

After a pressure container equipped with a stirrer was charged with

| | |
|---|---|
| Enlarged Latex (B-1) | 75 parts |
| (in terms of solids) | |
| potassium oleate | 0.3 parts |
| tetrasodium pyrophosphate | 0.005 parts |
| heated to 60° C. and purged with nitrogen, | |
| styrene | 12.5 parts |
| methyl methacrylate | 12.5 parts |
| diisopropylbenzene hydroperoxide | 0.1 parts |
| sodium formaldehydesulfoxylate | 0.05 parts | were added over 1 hour. The contents were then held for 5 hours. As a result, Graft Copolymer Latex (C-4) having a volume average particle diameter of 480 nm and a Dv/Dn of 1.35 was obtained.

After 0.5 parts of butylated hydroxytoluene (BHT) were added to this Graft Copolymer Latex (C-4), coagulation was conducted with 0.5% hydrochloric acid, and the resultant coagulum was washed with water, dehydrated and dried to obtain a powdered Graft Copolymer (D-4). The refractive index of the polymer (B-1) to be grafted in this Graft Copolymer (D-4) was 1.539, and the refractive index of Graft Copolymer (D-4) was 1.539.

Example 5

Graft Copolymer Latex (C-5) was obtained and Graft Copolymer (D-5) was recovered in the same manner as in Example 4 except that

| | |
|---|---|
| sodium formaldehydesulfoxylate | 3.3 parts |
| (5% aqueous solution) | |
| hydrogen peroxide (5% aqueous solution) | 1.8 parts | were used upon the enlargement of Latex (A-1) used in obtaining the graft copolymer of Example 4 by aggregation. Graft Copolymer Latex (C-5) had a volume average particle diameter of 205 nm and a Dv/Dn of 1.37. The refractive index of the polymer (B-5) to be grafted in this Graft Copolymer (D-5) was 1.539, and the refractive index of Graft Copolymer (D-5) was 1.539.

Comparative Example 4
1. Enlargement by Aggregation:
    While holding the Latex (a-3) obtained in Comparative Example 3 at 60° C.,

| | |
|---|---:|
| disodium dodecyl phenyl ether disulfonate was added, and | 0.05 parts |
| hydrochloric acid (0.15% aqueous solution) was then added to conduct enlargement by aggregation, and | 56 parts |
| sodium hydroxide (1% aqueous solution) | 10 parts | was then added to obtain Enlarged Latex (b-4). Enlarged Latex (b-4) had a volume average particle diameter of 200 nm and a Dv/Dn of 1.90 and was mechanically stable. Incidentally, the sum total of deposits and attachments to the polymerizer was 0.10% based on the charged monomers.

2. Graft Polymerization:
    Enlarged Latex (b-4) was used to conduct graft polymerization in the same manner as in Example 4, thereby obtaining Graft Copolymer Latex (c-4) having a volume average particle diameter of 205 nm and a Dv/Dn of 1.85, and powdered Graft Copolymer (d-4) was obtained in the same manner as in Example 4. The refractive index of the polymer (b-4) to be grafted in Graft Copolymer (d-4) was 1.539, and the refractive index of Graft Copolymer (d-4) was 1.539.

<Physical Properties of Resin Composition>
    Each of the graft copolymers obtained in Examples 4 and 5 and Comparative Example 4 was used to prepare a resin composition with a thermoplastic resin (MS resin) in accordance with the following formulation, thereby determining its physical properties. The refractive index of the MS resin used was 1.540.

| | |
|---|---:|
| Graft copolymer | 30 parts |
| MS resin (Denka TX-100, product of Denki Kagaku Kogyo Kabushiki Kaisha) | 70 parts |

The resin composition was pelletized by means of a twin-screw conical extruder having a diameter of 20 mm manufactured by Toyo Seiki Seisaku-Sho, Ltd., and the thus-obtained pellets were molded into a specimen for impact test having a thickness of 6 mm by means of an injection molding machine IS-80 manufactured by Toshiba Machine Co., Ltd. The impact test was performed at 23° C. The results are shown in Table 1.

TABLE 1

Physical properties of thermoplastic resin compositions (MS resin-based)

| | Graft copolymer | Impact strength [kJ/m$^2$] | Transmittance for parallel rays [%] | Haze [%] |
|---|---|---|---|---|
| Ex. 4 | D-4 | 17.8 | 85 | 3.2 |
| Ex. 5 | D-5 | 5.8 | 90 | 1.7 |
| Comp. Ex. 4 | d-4 | 3.2 | 89 | 2.0 |

As shown in Table 1, the resin composition comprising the graft copolymer (Example 4) enlarged in particle diameter according to the present invention is achieved in a great improvement on impact strength compared with the resin composition comprising the graft copolymer (Comparative Example 4) prepared by using the ordinary technique for enlargement by aggregation though the transparency is slightly deteriorated. The resin composition making use of the graft copolymer (Example 5) according to the present invention, which has the same particle diameter as that in Comparative Example 4 and a narrower particle diameter distribution, is improved in balance between impact strength and transparency compared with the resin composition making use of the graft copolymer of Comparative Example 4.

Example 6
1. Graft Polymerization:
    After a pressure container equipped with a stirrer was charged with

| | |
|---|---:|
| Enlarged Latex (B-3) (in terms of solids) | 75 parts |
| potassium oleate | 0.3 parts |
| tetrasodium pyrophosphate | 0.005 parts |
| heated to 60° C. and purged with nitrogen, | |
| methyl methacrylate | 12.5 parts |
| butyl acrylate | 2.5 parts |
| t-butyl hydroperoxide | 0.2 parts |
| sodium formaldehydesulfoxylate | 0.2 parts |
| were added over 1 hour. After the contents were then held for 3 hours, | |
| styrene | 10 parts |
| t-butyl hydroperoxide | 0.1 parts |
| sodium formaldehydesulfoxylate | 0.1 parts | were added over 1 hour. The contents were then held for 5 hours to obtain Graft Copolymer Latex (C-6) having a volume average particle diameter of 265 nm and a Dv/Dn of 1.37. Powdered Graft Copolymer (D-6) was obtained from this Graft Copolymer Latex (C-6) in the same manner as in Example 4.

Comparative Example 5
1. Preparation of Latex:
    After a pressure container equipped with a stirrer was charged with

| | |
|---|---:|
| tetrasodium pyrophosphate | 0.1 parts |
| ferrous sulfate | 0.005 parts |
| disodium ethylenediaminetetraacetate | 0.008 parts |
| sodium formaldehydesulfoxylate | 0.05 parts |
| disodium dodecyl phenyl ether disulfonate | 0.02 parts |
| potassium oleate | 0.37 parts |
| distilled water | 200 parts |
| and purged with nitrogen, | |
| diisopropylbenzene hydroperoxide | 0.1 parts |
| butadiene | 100 parts | were added. The contents were then held at 70° C. for 15 hours to obtain Latex (a-5) having a conversion of 98% and a volume average particle diameter of 95 nm.

2. Enlargement by Aggregation:
    While holding the Latex (a-5) obtained above at 60° C.,

| | |
|---|---:|
| hydrochloric acid (0.15% aqueous solution) was added to conduct enlargement by aggregation, and | 60 parts |
| sodium hydroxide (1% aqueous solution) | 10.7 parts | was then added to obtain Enlarged Latex (b-5). Enlarged Latex (b-5) had a volume average particle diameter of 220 nm and a Dv/Dn of 1.87 and was mechanically stable. Incidentally, the sum total of deposits and attachments to the polymerizer was 0.12% based on the charged monomer.

3. Graft Polymerization:

Enlarged Latex (b-5) was used to conduct graft polymerization in the same manner as in Example 6, thereby obtaining Graft Copolymer Latex (c-5) having a volume average particle diameter of 225 nm and a Dv/Dn of 1.85, and powdered Graft Copolymer (d-5) was then obtained in the same manner as in Example 4.

<Physical Properties of Resin Composition>

Each of the graft copolymers obtained in Example 6 and Comparative Example 5 was used to prepare a resin composition with a thermoplastic resin (vinyl chloride resin) in accordance with the following formulation, thereby determining its physical properties. More specifically, the following blending components were provided and charged into a Henschel mixer and heated to 115° C. with stirring to obtain a resin composition evenly mixed.

| | |
|---|---|
| Graft copolymer | 9 parts |
| Vinyl chloride resin ("S9008", product of Kureha Kagaku Kogyo K.K.) | 91 parts |
| Processing aid ("K130P", product of Kureha Kagaku Kogyo K.K.) | 1.0 part |
| Octyltin mercaptide ("KS2000A", product of Kyodo Chemical Co., Ltd.) | 1.8 pats |
| Calcium stearate ("Ca-St", product of Nitto Kasei Co., Ltd.) | 0.5 parts |
| Ester-based lubricant ("SL-02", product of Riken Vitamin Co., Ltd.) | 0.6 parts |
| Titanium oxide ("DP-3T-55", product of Resino Color Industry Co., Ltd.) | 0.1 part |

The resin composition thus obtained was pelletized by means of a twin-screw conical extruder having a diameter of 20 mm manufactured by Toyo Seiki Seisaku-Sho, Ltd., and the thus-obtained pellets were molded into a specimen for impact test having a thickness of 3 mm by means of an injection molding machine IS-80 manufactured by Toshiba Machine Co., Ltd. The impact test was performed at 23° C. and −10° C. The results are shown in Table 2.

TABLE 2

Physical properties of thermoplastic resin compositions (PVC-based)

| | Graft copolymer | Impact strength (23° C.) [kJ/m$^2$] | Impact strength (−10° C.) [kJ/m$^2$] |
|---|---|---|---|
| Ex. 6 | D-6 | 116 | 41.0 |
| Comp. Ex. 5 | d-5 | 116 | 18.9 |

As shown in Table 2, the resin composition comprising the graft copolymer (Example 6) according to the present invention is achieved in a great improvement on impact strength at the low temperature compared with the resin composition comprising the graft copolymer (Comparative Example 5) prepared by using the ordinary technique for enlargement by aggregation though the same impact resistance is exhibited at 23° C.

INDUSTRIAL APPLICABILITY

According to the present invention, there is provided a process for preparing an enlarged latex, which is economical and high in productivity and permits enlarging a latex while retaining the stability of the latex. According to the preparation process of an enlarged latex according to the present invention, the stability of the latex is not impaired even when a polymerizable monomer is graft polymerized in the presence of the enlarged latex.

According to the present invention, there are also provided enlarged latices having such excellent various properties, a process for preparing a graft copolymer by polymerizing a polymerizable monomer in the presence of such an enlarged latex, resin compositions containing said graft copolymer and a thermoplastic resin, and graft copolymers having a great particle diameter and an even particle diameter distribution. The resin compositions according to the present invention are economically improved in physical properties (particularly, impact resistance). Accordingly, the present invention can be applied to various fields in industries of which a latex having a great particle diameter and a graft copolymer having a great particle diameter are required.

What is claimed is:

1. A process for preparing an enlarged latex by enlarging a latex by aggregation, which comprises
   (1) causing
      (a) an anionic surfactant and
      (b) at least one surfactant selected from the group consisting of a cationic surfactant and an amphoteric surfactant to exist in the latex,
   (2) adding, as an aggregating and enlarging agent, at least one selected from the group consisting of:
      (i) an inorganic acid,
      (ii) an organic acid,
      (iii) a substance which forms an acid in water,
      (iv) a combination of at least two substances which are reacted with each other to form an acid, and
      (v) a substance which forms an acid by exposure to active rays to the latex in the presence of these surfactants, and
   (3) causing the acid derived from the aggregating and enlarging agent to act on the latex, thereby enlarging the particle diameter of the latex.

2. The preparation process according to claim 1, wherein the latex is a (co)polymer latex of diene monomer(s), (co)polymer latex of vinyl monomer(s) or copolymer latex of a diene monomer with a vinyl monomer.

3. The preparation process according to claim 1, wherein (a) the anionic surfactant and (b) at least one surfactant selected from the group consisting of a cationic surfactant and an amphoteric surfactant are used as surfactants in the step (1) to emulsion polymerize the monomer(s), thereby causing these surfactants (a) and (b) to exist in the latex.

4. The preparation process according to claim 1, wherein the anionic surfactant is a carboxylate type anionic surfactant.

5. The preparation process according to claim 1, wherein the cationic surfactant is a quaternary ammonium salt having at least one alkyl group, a primary to tertiary amine salt having at least one alkyl group, an alkylphosphonium salt or an alkylsulfonium salt.

6. The preparation process according to claim 1, wherein the amphoteric surfactant is a betaine, a carboxylic acid type amphoteric surfactant containing a betaine, a sulfate type amphoteric surfactant or a sulfonic acid type amphoteric surfactant.

7. The preparation process according to claim 1, wherein in the step (1), (b) at least one surfactant selected from the group consisting of the cationic surfactant and the amphoteric surfactant is caused to exist in the latex in a proportion of 0.01 to 100 mol per 100 mol of (a) the anionic surfactant.

8. The preparation process according to claim 1, wherein in the step (1), the surfactants (a) and (b) are caused to exist in a proportion of 0.1 to 5 parts by weight in total per 100 parts by weight of the (co)polymer component in the latex or the monomer(s) forming the (co)polymer component.

9. The preparation process according to claim 1, wherein in the step (2), a combination of two substances which undergo a redox reaction to form an acid is used as (iv) the combination of at least two substances which are reacted with each other to form an acid.

10. The preparation process according to claim 9, wherein the combination of two substances which undergo a redox reaction to form an acid is a combination of hydrogen peroxide with a formaldehydesulfoxylate.

11. The preparation process according to claim 1, wherein in the step (3), the latex is enlarged by Brownian aggregation without conducting stirring of the latex.

12. The preparation process according to claim 1, wherein an enlarged latex having a volume average particle diameter of at least 150 nm is provided by the enlargement by aggregation.

13. The preparation process according to claim 1, wherein an enlarged latex having a particle diameter distribution of 1.2 to 1.8, represented by a ratio (Dv/Dn) of the volume average particle diameter (Dv) to the number average particle diameter (Dn) is provided.

14. An enlarged latex obtained by the preparation process according to claim 1.

15. A process for preparing a graft copolymer, which comprises polymerizing a polymerizable monomer in the presence of an enlarged latex, wherein the enlarged latex is obtained by a process comprising
  (1) causing
    (a) an anionic surfactant and
    (b) at least one surfactant selected from the group consisting of a cationic surfactant and an amphoteric surfactant to exist in a latex,
  (2) adding, as an aggregating and enlarging agent, at least one selected from the group consisting of:
    (i) an inorganic acid,
    (ii) an organic acid,
    (iii) a substance which forms an acid in water,
    (iv) a combination of at least two substances which are reacted with each other to form an acid, and
    (v) a substance which forms an acid by exposure to active rays to the latex in the presence of these surfactants, and
  (3) causing the acid derived from the aggregating and enlarging agent to act on the latex, thereby enlarging the particle diameter of the latex.

16. The preparation process according to claim 15, wherein the polymerizable monomer is a vinyl monomer.

17. The preparation process according to claim 15, wherein 95 to 5 wt. % of the vinyl monomer is polymerized with 5 to 95 wt. %, in terms of solids, of the enlarged latex.

18. The preparation process according to claim 15, wherein a graft copolymer having a particle diameter distribution of 1.2 to 1.8, represented by a ratio (Dv/Dn) of the volume average particle diameter (Dv) to the number average particle diameter (Dn), is obtained.

19. The preparation process according to claim 15, wherein a difference in refractive index between particles of the enlarged latex and the graft copolymer formed is at most 0.02.

20. The preparation process according to claim 15, wherein a graft copolymer having a volume average particle diameter of at least 150 nm is obtained.

21. A graft copolymer obtained by the preparation process according to claim 15.

22. A resin composition comprising the graft copolymer according to claim 21 and a thermoplastic resin.

23. The resin composition according to claim 22, which comprises 0.1 to 99.9 wt. % of the graft copolymer and 99.9 to 0.1 wt. % of the thermoplastic resin.

24. The resin composition according to claim 22, wherein the thermoplastic resin is polystyrene, high impact polystyrene, acrylic resin, methyl methacrylate-styrene resin, vinyl chloride resin, chlorinated vinyl chloride resin, acrylonitrile-styrene resin, acrylonitrile-butadiene-styrene resin, thermoplastic polyester resin, polycarbonate resin or a mixture thereof.

25. A graft copolymer containing an anionic surfactant and at least one surfactant selected from the group consisting of a cationic surfactant and an amphoteric surfactant and having a ratio (Dv/Dn) of the volume average particle diameter (Dv) to the number average particle diameter (Dn) of 1.2 to 1.8.

26. The graft copolymer according to claim 25, wherein the volume average particle diameter (Dv) is at least 150 nm.

27. A resin composition comprising the graft copolymer according to claim 25 and a thermoplastic resin.

* * * * *